R. C. LICHTWALD.
END GATE.
APPLICATION FILED AUG. 28, 1909.
977,457.
Patented Dec. 6, 1910.
3 SHEETS—SHEET 1.
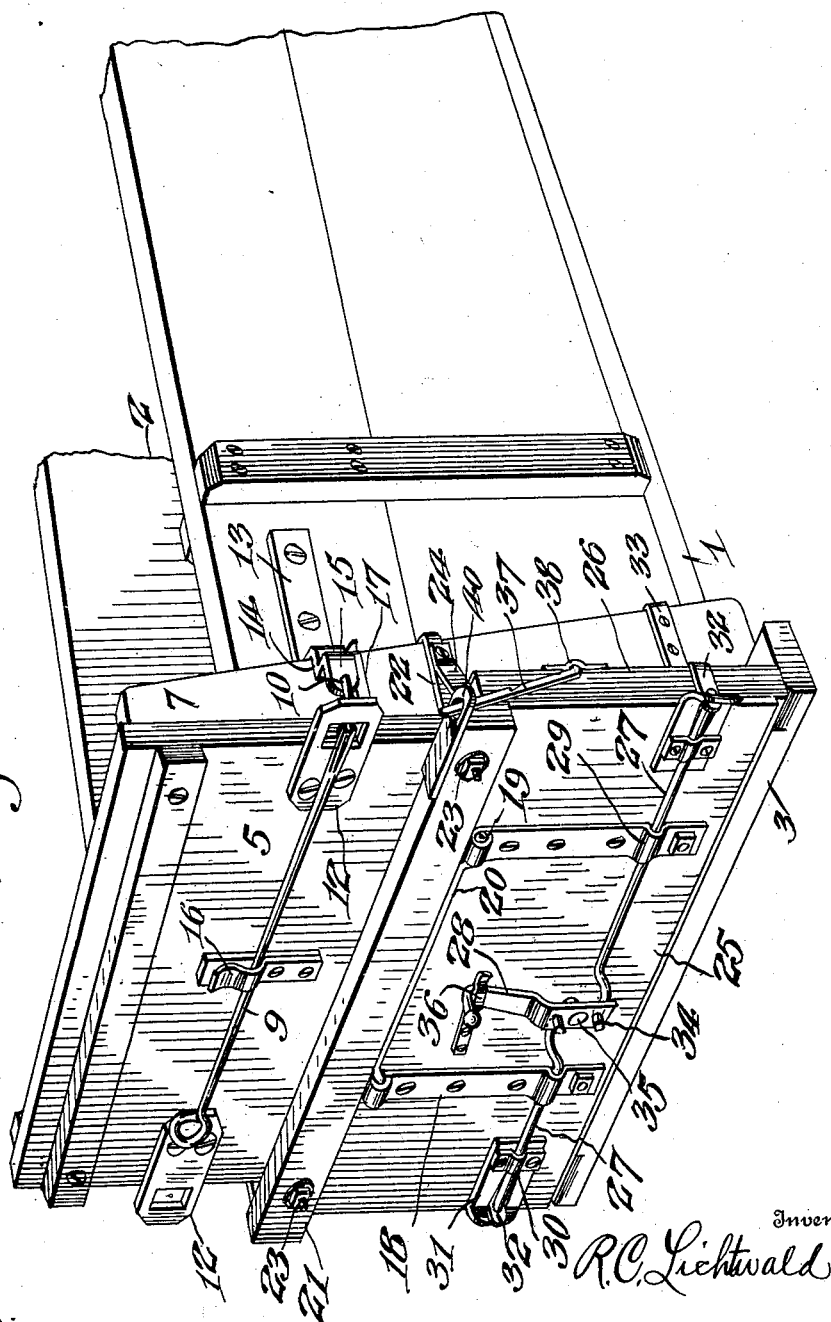

R. C. LICHTWALD.
END GATE.
APPLICATION FILED AUG. 28, 1909.
977,457.
Patented Dec. 6, 1910.
3 SHEETS—SHEET 2.
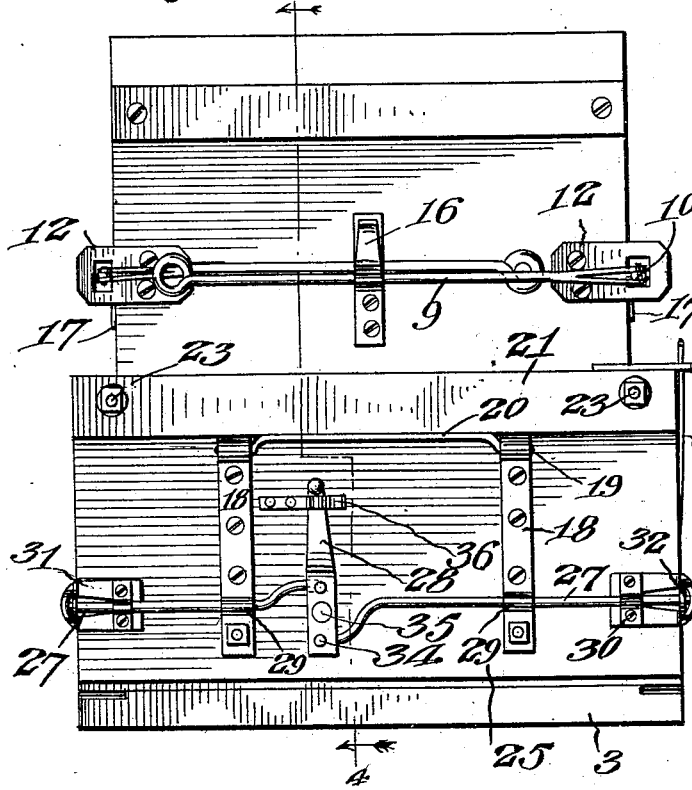
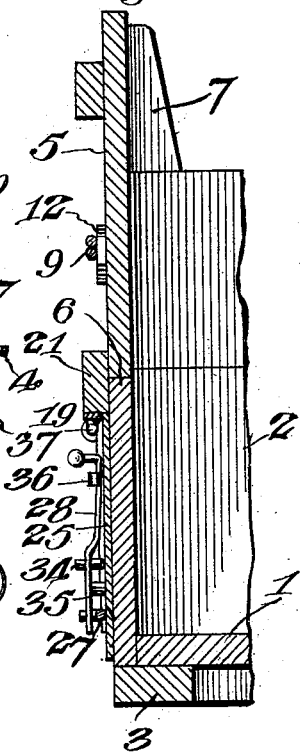
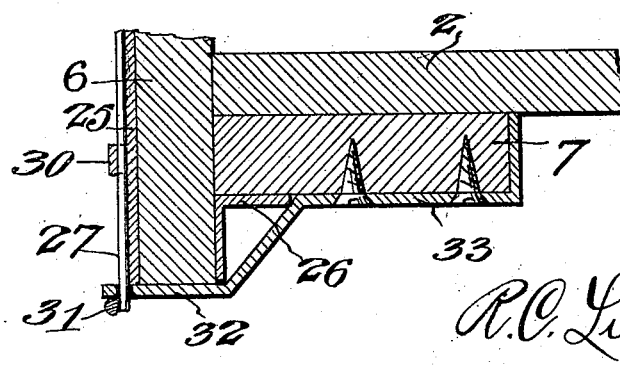
Witnesses:
Joe P. Mahler
E. M. Ricketts
Inventor
R. C. Lichtwald
By Watson E. Coleman
Attorney R. C. LICHTWALD.
END GATE.
APPLICATION FILED AUG. 28, 1909.
977,457.
Patented Dec. 6, 1910.
3 SHEETS—SHEET 3.
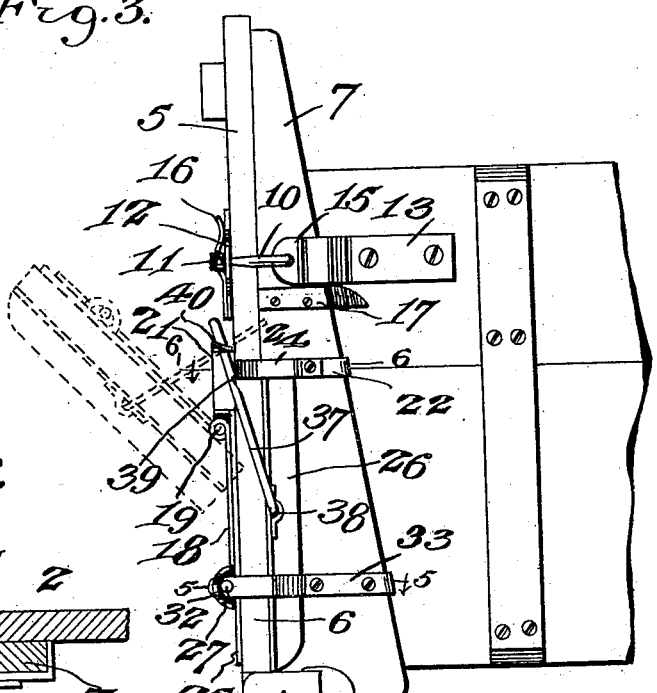
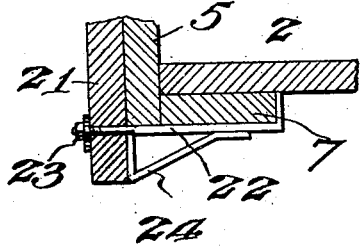
Witnesses:
Joe. P. Wahler.
E. M. Ricketts.
Inventor
R. C. Lichtwald
By Watson E. Coleman
Attorney

UNITED STATES PATENT OFFICE.

ROBERT C. LICHTWALD, OF DECATUR, NEBRASKA.

END-GATE.

977,457.
Specification of Letters Patent.
Patented Dec. 6, 1910.

Application filed August 28, 1909. Serial No. 515,052.

*To all whom it may concern:*

Be it known that I, ROBERT C. LICHTWALD, a citizen of the United States, residing at Decatur, in the county of Burt and State of Nebraska, have invented certain new and useful Improvements in End-Gates, of which the following is a specification, reference being had to the accompanying drawings.

This invention relates to improvements in end gates for application to wagons in which grain is hauled.

The objects of my invention are to provide an improved construction of end gate and means for fastening it, to provide an end gate having a grain door and to provide improved fastening devices for such door.

With the above and other objects in view, the invention consists of the novel construction, combination and arrangement of parts, hereinafter fully described and claimed, and illustrated in the accompanying drawings in which—

Figure 1 is a perspective view of my improved end gate showing it applied to a wagon body, one of the fastening rods being omitted for the sake of clearness. Fig. 2 is a rear elevation. Fig. 3 is a side elevation. Fig. 4 is a vertical section taken on the plane indicated by the line 4—4 in Fig. 2. Figs. 5 and 6 are detail horizontal sections taken respectively on the planes indicated by the lines 5—5 and 6—6 in Fig. 3. Fig. 7 is a detail perspective of one of the gate fastening rods and the hook which it carries.

Referring more particularly to the drawings, 1 denotes the bottom and 2 the sides of a wagon body.

3 denotes a cross bar secured across the rear end of the bottom and having projecting ends.

5 denotes my improved end gate which consists of a solid upper portion, an open lower portion adapted to be closed by a grain door 6, and two side bars 7 secured to the inner face of the solid upper portion of the gate and adapted to receive the walls 2 of the wagon body between them. The side bars 7 are preferably broad at their lower ends and the latter are notched as shown at 8 for the reception of the projecting ends of the bar 3. The engagement of the notched or shouldered ends 8 of said side bars with the bottom bar 3 retains the lower portion of the gate across the end of the wagon body, and I secure the upper portion of the gate by the use of two fastening rods 9 and attached hooks 10. The latter are pivoted in the bifurcated ends 11 of the rods 9, as shown more clearly in Fig. 7, and they are adapted to be passed through openings in plates 12 and to engage openings in brackets 13. The plates 12 are secured to the outer face of the closed upper portion of the end gate and have their apertured or opened ends projecting beyond the side edges of the gate. The brackets 13 are in the form of metal straps secured to the outer faces of the side walls of the wagon and having angular portions 14 to receive the side bars 7, and also angularly offset apertured ends 15, which latter are engaged by the bent ends of the hooks 10. The handle portions of the fastening rods 9 are retained in parallel overlapping relation, when the end gate is fastened in position on the wagon, by engaging them with a keeper hook 16 in the form of a leaf spring disposed vertically and having its lower end secured to the center of the outer face of the upper portion of the gate.

17 denotes metal guide plates secured at one end to the outer side faces of the bars 7 and having rounded or beveled ends adapted to engage and slide under the offset portions 14 of the bracket 13 when the end gate is placed in position on the wagon body. The grain door 6 is hung from its upper edge to swing outwardly and upwardly, such mounting being effected by securing to the outer face of said door upright hinge straps 18 having eyes at their upper ends to engage offset outwardly projecting pivots 19 on a transverse strap 20. The latter is secured to the bottom of a reinforcing bar 21 secured across the bottom edge of the solid upper portion of the end gate and having projecting ends so that it is of substantially the same width as the door. This bar 21 is securely fastened to the gate at its ends by angular straps 22 secured to the side bars 7 and having threaded ends extending through the bar 21 to receive washers and nuts 23. Angular braces 24 are arranged on the straps or brackets 22 to support the ends of the bar 21, as will be understood on reference to Fig. 6. If desired the door 6 may have its outer face covered by a reinforcing metal wear plate 25, and secured to its inner face at its projecting ends are reinforcing angle metal strips 26 adapted to engage the outer faces of the side bars 7 of the gate, when the door is closed, as shown more clearly in Fig. 5.

The door is adapted to be securely fastened in its closed position by a pair of sliding bolts 27 which are projected and retracted simultaneously by a hand lever 28. The bolts 27 extend horizontally across the outer face of the door and are loosely slidable in guide loops 29 formed by bending the hinge straps 18 and also in bearings 30 arranged upon guide plates 31 secured to the door adjacent its ends. The plates 31 have outwardly curved apertured ends to receive the apertured rear ends 32 of angular straps 33 secured to the outer faces of the side bars 7 of the gate as shown in Fig. 5. The outer ends of the bolts 27 when the latter are projected enter the apertured ends 32 of the straps or brackets 33 for the purpose of locking the gate in closed position. The inner ends of the bolts 27 are offset and bent to provide pivots 34 arranged in the lever 28 on opposite sides of its pivot or fulcrum 35. The upper end of the lever 28 is bent to provide a handle and it is adapted to be sprung under a keeper in the form of a leaf spring 36 which retains it against casual movement when the bolts 27 are projected to locking position.

For the purpose of supporting the grain door in its upwardly tilted position which is indicated in dotted lines in Fig. 3, I provide a holding brace rod 37 and pivot one end of it to one end of the door as shown at 38. The other or free end of the brace 37 is provided with a notch 39 and it is adapted to slide through an opening in the projecting end of a plate 40 secured to the bar 21. When the door is swung upwardly the shoulder formed by the notch 39 will engage the plate 40 so as to support said door in its dotted line position shown in Fig. 3.

From the foregoing description taken in connection with the accompanying drawings, it is thought that the construction, operation and advantages of the invention will be readily understood without a more extended explanation.

Having thus described the invention what I claim is:

1. A wagon end gate comprising a body portion, side bars secured thereto and having projecting lower ends, keepers upon the latter, a reinforcing bar arranged across the bottom of the body portion of the gate, a hinge strap having its central portion secured to the bottom edge of said reinforcing bar and its ends downwardly offset and formed with pintles, a grain door, a pair of vertically disposed hinge straps secured on the outer face of the grain door and having their upper ends bent to form hinge eyes to engage said pintles, the lower portions of the last mentioned hinge straps being bent to form guide loops, bolts slidably arranged in said guide loops and adapted to engage said keepers, and means for projecting and retracting said bolts.

2. A wagon end gate comprising a body portion, side bars secured thereto and having projecting lower ends, a reinforcing bar arranged across the bottom of the body portion of the gate, a grain door hinged to said reinforcing bar to swing upwardly and outwardly, plates secured to the end portions of said reinforcing bar and having projecting extremities formed with vertical opening and the holding brace rods 37 pivoted to the ends of the grain door to extend upwardly through the openings in said plates and formed with notches to engage said plates, whereby the grain door will be retained in its elevated or open position.

In testimony whereof I hereunto affix my signature in the presence of two witnesses.

ROBERT C. LICHTWALD.

Witnesses:
H. S. M. SPIELMAN,
ETHEL BLACKSTONE.